United States Patent Office 3,256,506
Patented June 14, 1966

3,256,506
HALOGEN-CONTAINING POLYURETHANE COMPOSITIONS AND PROCESSES FOR PREPARING SAME
Richard M. Anderson, St. Louis, and James C. Wygant, Creve Coeur, Mo., assignors to Monsanto Company, a corporation of Delaware
No Drawing. Filed Jan. 2, 1963, Ser. No. 248,858
24 Claims. (Cl. 260—77.5)

This invention relates to novel flame-retardant polyurethane compositions and polyurethane resins prepared therefrom. More particularly the present invention resides in halogen-containing polyurethane compositions having co-reacted therein hydroxyl-containing polyesters derived from polybasic (2,3-dihaloalkyl)succinic compounds and the polyurethane resins which are prepared therefrom.

It is an object of the present invention to provide novel flame-retardant polyurethane compositions. A particular object is to provide polyurethane compositions having a high halogen content, which compositions contain co-reacted therein an hydroxyl-containing polyester derived from a polybasic (2,3-dihaloalkyl)succinic compound. Another object is to provide polyurethane resins which are resistant to burning. A specific object is to provide flame-retardant polyurethane foams. A still further object is to provide compositions from which flame-retardant polyurethane resins may be easily and inexpensively prepared, while having excellent physical characteristics. Other objects and advantages of the present invention will appear hereafter.

In accordance with the present invention it has been found that polyurethane resins satisfying the aforementioned objects may be prepared by reacting together a hydroxyl-containing polyester comprising the reaction product of a polybasic (2,3-dihaloalkyl)succinic compound and a polyhydric alcohol, an organic polyisocyanate, and usually a hydroxyl-containing polyether. A forming agent is also included in the charge where cellular polyurethane is desired.

By "halo" or "halogen" as used herein it meant the nonmetallic elements of the seventh group of the periodic system and in particular chlorine and bromine.

The term "polybasic (2,3-dihaloalkyl) succinic compound" is intended to include (2,3-dihaloalkyl)succinic acid, (2,3-dihaloalkyl)succinic anhydride, (2,3-dihaloalkyl)succinic halide, esters of (2,3-dihaloalkyl)succinic acid, and like compounds, which on reaction with polyhydric alcohols produce halogenated polyesters. These compounds have the general structural formula:

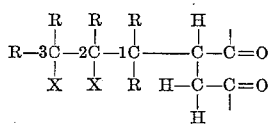

where "X" is an halogen atom and "R" is hydrogen or a lower alkyl substituent.

The halo groups are usually identical (e.g., both halo groups are chlorine or both are bromine) can be different (e.g., where one halo is chlorine and the other is bromine). The R's can be the same or different (i.e., represent different substituents) and, when alkyl, generally have no more than five carbon atoms and, preferably, have only one or two carbons (i.e., R is methyl or ethyl). In a particularly preferred group of (2,3-dihaloalkyl) succinic compounds the R in the "two" position is hydrogen and at least one of the R's in the "three" position is hydrogen. (These compounds have greater stability than the corresponding alkyl substituted compounds.)

Specific compounds included within the scope of this invention are the (2,3-dihalopropyl), (2,3-dihalobutyl), (2,3 - dihalo-1-methylpropyl), (2,3-dihalo-1,1-dimethylpropyl), (2,3-dihalo-1-ethylpropyl), (2,3-dihalo-1-methylbutyl), (2,3 - dihalo - 1,1 - dimethylbutyl), (2,3-dihalo-1-ethylbutyl) (2,3-dihalopentyl), etc., derivatives of succinic anhydride, succinic acid, etc.

"Esters of (2,3-dihaloalkyl)succinic acid" as used above refers to both mono- and diesters which are usually derived from the lower, straight or branched-chain monohydric alcohols having no more than four carbon atoms (e.g., methanol, ethanol, isopropl alcohol, etc.).

By "polyurethane composition" is understood a mixture of substances that can be converted to polyurethane resins.

"Pouyurethane resin" as used herein includes polymers made as flexible and rigid foams (i.e., cellular polyurethanes), flexible and stiff fibers, coatings, and films, and as elastomers.

The polyurethane resins of the present invention have particular utility in preparing flame-retardant surface coatings, elastomers, adhesives, fibers, furniture, insulation, and bedding. These flame-retardant polyurethanes also have potential uses in automobiles and aircraft (e.g., as side panels, carpet underlay, headliners, weather stripping, seat cushioning, etc.), as consumer products (e.g. toys, novelties, knitwear, ironing board pads, dish mops, clothes brushes, etc.), and in the construction field (e.g., curtain walls, building panels, roof insulation, ceiling tiles, sound-deadening panels, etc.).

The halogen-containing polybasic compounds used in this invention are conveniently prepared by halogen addition to the corresponding allylsuccinic compounds. For example, direct addition of bromine is generally accomplished at low temperatures (i.e., from about minus twenty-five to plus fifty degrees centigrade) using a solvent such as chloroform, carbon disulfide, acetic acid, or diethyl ether. Addition is sometimes aided by artificial light or sunlight. Strong heating promotes substitution and dehydrohalogenation and is not recommended. Additions with more reactive gaseous chlorine are best carried out slowly at still lower temperatures (i.e., from about minus fifty to plus twenty-five degrees centigrade) to avoid side reactions. Sulfuryl chloride and phosphorus pentachloride can be used as chlorinating agents if desired. Mixed dihalides are readily prepared by substitution reactions, for example, a bromo-chloride is formed by treating a dichloride with a molar equivalent of sodium bromide in acetone.

Obviously these halogen-containing compounds are preparable from one another. For example (2,3-dihaloalkyl)succinic acid is formed by boiling (2,3-dihaloalkyl)succinic anhydride in water for several minutes, (2,3-dihaloalkyl)succinyl chloride is formed from the dihalo anhydride or dihalo acid on treatment with thionyl halide; etc. The polybasic (2,3-dihaloalkyl)succinic compounds are more fully disclosed in application, S.N. 248,853, filed of even date herewith, now abandoned.

The hydroxyl-containing polyesters used in this invention are prepared by reacting the halogen-containing polybasic compounds discussed above with certain polyhydric alcohols. Suitable alcohols are aliphatic or cycloaliphatic and may contain one or more dissimilar atoms between carbon atoms in the molecule, such as oxygen, sulfur and the like. They may be saturated or unsaturated (double or triple bonds) and be substituted with non-interfering substituents such as halogen atoms, ester radicals and the like.

As a rule polyhydric alcohols employed in the present invention have twenty or fewer carbon atoms. Particularly preferred are the aliphatic polyhydric alcohols and ether polyols possessing from two to four esterifiable hydroxyl groups and containing no more than ten carbons. For some applications it is desirable that at least a portion of the total polyhydric alcohol component consist of three hydroxyl groups (this provides a means for branching where the resultant polyester is used to prepare the more rigid polyurethane foams).

Illustrative polyhydric alcohols include the following: ethylene glycol, 1,2-propylene glycol, 1,3-propylene glycol, 1,4-butanediol, 1,3-butanediol, 2,3-butanediol, 1,6-hexanediol, polyethylene glycols such as diethylene glycol and triethylene glycol, polypropylene glycols, glycerol, pentaerythritol, mannitol, sorbitol, 1,4,6 - octanetriol, methyl glucoside, 1,4-cyclohexane glycol, etc., and ethylene and propylene oxide adducts of these polyols.

The condensation of the selected acids and alcohols is done by heating the reactants together, preferably at about one hundred to two hundred and fifty degrees centigrade either with or without a reaction diluent. Where the polyesters are to be converted to the polyisocyanate modified products substantially anhydrous conditions are often employed. This can be accomplished by distilling the water formed during the reaction or by using some inert drying agent. Preferably the esterification is run under an inert atmosphere such as nitrogen. An excess of alcohol, twenty percent or more, is often used to control molecular weight and insure that there are little or no acidic components remaining in the final polyesters (i.e., the terminal groups will be predominantly alcoholic hydroxyl radicals).

The degree and state of polymerization of the polyesters may be conveniently determined by analysis for the average number of carboxyl and hydroxyl groups in a given amount of the polyester. The acid number (milligrams of KOH per gram of polyester using phenolphthalein as an indicator) is a measure of the number of terminal carboxyl groups in the polyester. The hydroxyl number (milligrams of KOH per gram of polyester as determined by adding pyridine and acetic anhydride to the polyester and titrating the acetic acid formed with KOH) is a measure of the number of terminal hydroxyl groups present.

The sum of the acid and hydroxyl numbers is an indication of the average number of terminal groups present in the polyester product. The rigid polyurethane resins utilize a highly branched hydroxyl rich polyester having a hydroxyl number between about two hundred and fifty and seven hundred. The flexible polyurethane resins utilize a linear, relatively hydroxyl poor polyester having an hydroxyl number between about twenty and one hundred and fifty. If a polyester with a hydroxyl number between about one hundred and fifty and two hundred and fifty is employed, a semi-rigid polyurethane foam is obtained. Whatever the hydroxyl number, the preferred polyesters have a maximum acid number of ten and, usually, five or less. So long as the polyester has a suitable hydroxyl number its chain length is immaterial. For example diesters and high molecular weight polyesters are suitable for preparing the polyurethane compositions of this invention.

Polyurethane resins are obtained by reacting the hydroxyl-containing polyesters prepared from the (2,3-dihaloalkyl)succinic compounds with organic polyisocyanates. Conditions and procedures to be employed are given in the subsequent paragraphs.

The polyisocyanates used to prepare the polyurethane resins are usually diisocyanates because they are readily available commercially, but other polyisocyanates are equally suitable. As a rule the aromatic substituted polyisocyanates are preferred over the aliphatic members. Obviously mixtures of isocyanates may be employed.

Suitable polyisocyanates include the following: 2,4-tolylene diisocyanate, diphenyl methane 4,4'-diisocyanate, 2,6-tolylene diisocyanate, hexamethylene diisocyanate, ethylene diisocyanate, trimethylene diisocyanate, tetramethylene diisocyanate, pentamethylene diisocyanate, 1,2-propylene diisocyanate, 1,2-butylene diisocyanate, etc.

Optionally a suitable catalyst is included to accelerate the reaction. Catalysts which may advantageously be employed include the known catalysts for isocyanate reactions, such as tertiary amines (e.g., triethylamine, N-methylmorpholine, triethanolamine, etc.); antimony compounds (e.g., antimony caprylate, antimony naphthenate, antimonous chloride, etc.); and/or tin compounds (e.g., dibutyltin dilaurate, hexabutylditin, stannous octoate, tributyltin phosphate, stannic chloride, etc.). The catalyst, whether one or more substances, is usually used in an amount less than about five weight percent of the polyisocyanate.

In order to obtain preferred polyurethane resins compounds having at least two active hydrogens (as determined by the Zerewitinoff method) which are capable of reacting with the polyisocyanate are advantageously included in the reaction mixture. Prime examples are hydroxyl-containing polyethers such as polypropylene glycol or a polypropylene oxide derivative of glycerol or sorbitol. Preferably these polyethers have an hydroxyl number from about 20 to 700 (polyethers with high numbers being used to prepare rigid polyurethanes and those with low numbers being employed in making flexible polyurethanes). They may be employed in amounts up to about two or three times the weight of the hydroxyl-containing polyester in the reaction mixture.

Where cellular polyurethane resins are desired, reaction between the halogen-containing polyester and the polyisocyanate is carried out in the presence of a foaming agent which may be water and/or a low boiling liquid. Water reacts with polyisocyanates to liberate gaseous products (i.e., chemical blowing), while the low boiling liquids are vaporized (mechanical blowing). Particularly preferred foaming agents, besides water, are the fluorinated hydrocarbons, for examples, trichloromonofluoromethane, dichlorodifluoromethane, monochlorotrifluoromethane, monobromotrifluoromethane, tetrafluoromethane, monochlorodifluoromethane, trichlorotrifluoroethane, dichlorotetrafluoroethane, octafluorocyclobutane, tetrachlorodifluoroethane, trichloromonofluoromethane, trichlorotrifluoroethane, etc. The foaming agents are most often used in less than about ten weight percent of the polyisocyanate.

Sometimes included in the reaction mixture in minor proportions are the low molecular weight polyhydric alcohols which give resins with better mechanical properties for some uses. Preferred alcohols for this purpose are trimethyol propane, glycerol, ethylene glycol, and diethylene glycol; however any aliphatic alcohol containing at least two hydroxyl groups may be employed. Other suitable additives with two or more active hydrogens that may be employed include diamines, dibasic carboxylic acids, amino acids, hydroxy acids, amino alcohols, and certain ureas and substituted ureas.

Additionally minor amounts of other additives can be incorporated for various purposes. For instance silicone surfactants can be used to control pore size; fillers such as clay, calcium sulfate, ammonium phosphate, etc., may be added to lower cost and improve density; ingredients such as dyes may be added for color; fibrous glass, asbestos, or synthetic fibers may be added for strength; etc.

It is desirable to employ the polyisocyanates in amounts approximately chemically equivalent to the total material in the polyurethane composition containing active hydrogens. This includes, besides the hydroxyl-containing polyesters derived from the (2,3-dihaloalkyl)succinic compounds, other substances present that will react with polyisocyanates, for example, water, hydroxyl-containing polyethers, monohydric alcohols, etc. In practice the polyisocyanates are usually used in about ninety to one hundred and ten percent where the calculated stoichiometric equivalent is taken as one hundred percent. However more or less polyisocyanate may be employed.

Of the novel halogen-containing polyisocyanate resins herein disclosed probably most suitable and useful are those containing bromine. These seem to have the best flame-retardant characteristics and, for this reason, are fully described and characterized in the examples as being the best contemplated embodiment of the present invention.

*Example 1.—Preparation of (2,3-dibromopropyl) succinic anhydride*

A mixture of 600 g. of maleic anhydride (6.1 moles), 5.0 g. of p-t-butylcatechol, polymerization inhibitor, and 600 ml. of benzene, diluent, is placed in a steel bomb. Propylene, 490 g. (11.6 moles), is introduced and the bomb heated at 200° C. for about 12 hours. After the bomb is opened, the benzene is removed leaving a yellow-brown solution. Distillation through a packed column gives 245 g. of allylsuccinic anhydride, B.P. 131–132° C./9.0 mm.

A solution of 140 g. (1 mole) of allyl-succinic anhydride in 125 ml. of acetic acid is placed in a 1-l. flask equipped with a reflux condenser, a dropping funnel, an electric stirrer, and a thermometer. To this is added a solution of 165 g. (1.03 moles) of bromine in 100 ml. of acetic acid over a period of about 40 minutes. During the addition an ice bath is used to maintain the temperature at 20–25° C. After being stirred for about 18 hours at room temperature, acetic acid is removed from the reddish-orange solution. The product begins to distill at 193° C./2.0 mm. (pot, 204° C.); as the distillation proceeds the B.P. varies from 187° C./1.2 mm. (pot, 198° C.) to 200° C./2.2 mm. (pot, 224° C.).[1]

The (2,3-dibromopropyl)succinic anhydride, a viscous, pale yellow oil, weighs 261 g. (87% yield).

*Analysis.*—Calcd. for $C_7H_8Br_2O_3$: C, 28.0%; H, 2.70%; Br, 53.3%. Found: C, 28.3%; H, 2.75%; Br. 53.0%.

*Example 2.—Preparation of a flexible polyurethane resin*

A flask equipped with a distillation trap, an electric stirrer, and a thermometer is charged with 60.0 g. of ethylene glycol (0.97 mole), 36.0 g. of (2,3-dibromopropyl)succinic anhydride (0.12 mole), and 40 ml. of xylene. The contents are esterified by refluxing at 145° C. After about 2 hours the reaction is stopped (final acid number reading is 1–13). Xylene and excess glycol are removed via the distillation trap and the system is evacuated at 130° C. for 15 minutes. Thirty-eight g. of the di-(2-hydroxyethyl) ester of (2,3-dibromo-propyl)-succinic acid is obtained.

The brominated diester is used in making a flexible polyurethane resin according to the following recipe: A blended mixture is prepared from 140 parts of Niax Triol LG–56 (an adduct of propylene oxide to glycerol having 3 hydroxyl groups and an hydroxyl number of 56), 1 part of stannous octoate, 1 part of N-methyl morpholine, and 1 part of 1-methyl-4-dimethylaminoethyl)piperazine, as catalysts. Sixty parts of di(2-hydroxethyl) ester of (2,3-dibromopropyl)succinic acid is added, followed by 70 parts of tolylene diisocyanate. The reaction mixture is stirred, poured in an aluminum foil container, and heat-aged in an over at 130° C. for 4 hours. The resulting polyurethane resin is tough, flexible and self-extinguishing when removed from an oxidizing flame.

*Example 3.—Preparation of a flexible polyurethane foam*

The di(2-hydroxyethyl)ester of (2,3-dibromopropyl)-succinic acid is prepared as in Example 2. A flexible polyurethane foam is made according to the following recipe: A blended mixture is prepared from 140 parts of Niax Triol LG–56 (an adduct of propylene oxide to glycerol having 3 hydroxyl groups and an hydroxyl number of 56), 2 parts of silicone surfacant to control pore size, 1 part of stannous octoate, 1 part of N-methyl morpholine, and 1 part of 1-methyl-4-(dimethyl-aminoethyl)piperazine, as catalysts. Sixty parts of di(2-hydroxyethyl) ester of 2,3-dibromopropyl) succinic acid and 6 parts of water are added, followed by 80 parts of tolylene diisocyanate. The reaction mixture is stirred until foaming starts and poured in an aluminum foil container. After the foaming process is substantially complete, the porous mass is initially heat-aged in an oven at 130° C. for 1 hour. The foamed product is removed, squeezed to half its original thickness and reheated (130° C.) for an additional hour. The resulting polyurethane is obtained as a flexible, soft-textured foam which is self-extinguishing when removed from an oxidizing flame.

*Example 4.—Preparation of a rigid polyurethane resin*

The following compounds in the proportions set out are introduced in a reaction vessel: Di-(2-hydroxyethyl) ester of 2,3-dibromopropyl)succinic acid, 35 parts; Niax Triol LK–380 (polyether having 3 hydroxyl groups and an hydroxyl number of 380, 32 parts; and stannous octoate, 1 part. The ingredients are thoroughly agitated under nitrogen. Thirty-two parts of tolylene diisocyanate is added and the reaction mass heated at 110° C. for 2 hours. The resulting polyurethane resin is separated and dried. The final product is self-extinguishing on removal from an oxidizing flame.

*Example 5.—Preparation of a rigid polyurethane foam*

The following compounds in the proportions set out are introduced in a reaction vessel; the di-(2-hydroxyethyl) ester of (2,3-dibromopropyl)succinic acid, 35 parts; Niax Triol LK–380 (a polyether having 3 hydroxyl groups and an hydroxyl number of 380), 32 parts; silicone oil, 1 part; stannous octoate, 1 part; and trichloromonofluoromethane, 1 part. The ingredients are well blended under nitrogen. Forty parts of tolylene diisocyanate is added; the mixture stirred rapidly for 20 seconds, then poured in a mold. The foam is allowed to expand at room temperature and then is cured at 130° C. for 2 hours. The final product has a fine cell structure and is flame-retardant.

What is claimed is:

1. A process for preparing flame-retardant polyurethane resins which comprises reacting (1) the reaction product of a polybasic (2,3-dihaloalkyl)succinic compound of the formula

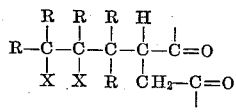

wherein X is selected from the group consisting of bromine and chlorine, R is selected from the group consisting of hydrogen and alkyl having from 1 to 5 carbon atoms, and the indicated free valences on the double bond oxygen carbon atoms taken separately are satisfied by a member of the group consisting of hydroxyl, and alkyl ester having from 1 to 4 carbon atoms in the alkyl, and taken together are satisfied by an oxygen anhydride bridge between the two double bond oxygen carbon atoms, and excess polyhydric alcohol and (2) an organic polyisocyanate.

2. A process as described in claim 1 wherein the flame-retardant polyurethane resin being prepared is made cellular by including in the reaction mixture (3) a foaming agent.

3. A process as described in claim 1 wherein the reaction mixture used to prepare the flame-retardant polyurethane resin includes (3) a hydroxyl-containing polyether.

---
[1] In another run the (2,3-dibromopropyl) succinic anhydride distilled at 168–181° C./0.2–0.17 mm. (pot, 179°–194° C.).

4. A process as described in claim 2 where the reaction mixture used to prepare the flame-retardant, cellular polyurethane resin includes (4) a hydroxyl-containing polyether.

5. A flame-retardant polyurethane resin comprising the reaction product of (1) the reaction product of a polybasic (2,3-dihaloalkyl)succinic compound of the formula

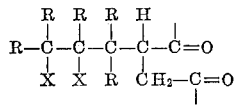

wherein X is selected from the group consisting of bromine and chlorine, R is selected from the group consisting of hydrogen and alkyl having from 1 to 5 carbon atoms, and the indicated free valences on the double bond oxygen carbon atoms taken separately are satisfied by a member of the group consisting of hydroxyl, and alkyl ester having from 1 to 4 carbon atoms in the alkyl, and taken together are satisfied by an oxygen anhydride bridge between the two double bond oxygen carbon atoms, and excess polyhydric alcohol and (2) an organic polyisocyanate.

6. A flame-retardant polyurethane resin reaction product as described in claim 5 which is made cellular by including in the reaction mixture used to prepare said reaction product (3) a foaming agent.

7. A flame-retardant polyurethane resin reaction product as described in claim 5 wherein the reaction mixture used to prepare said reaction product includes (3) a hydroxyl-containing polyether.

8. A flame-retardant polyurethane resin reaction product as described in claim 7 which is made cellular by including in the reaction mixture used to prepare said reaction product (4) a foaming agent.

9. A process for preparing flame-retardant polyurethane resins which comprises reacting (1) the reaction product of (a) a polybasic compound selected from the group consisting of (2,3-dibromopropyl)succinic acid, (2,3-dibromopropyl)succinic anhydride, (2,3-dibromopropyl)succinyl halide, and esters of (2,3-dibromopropyl)succinic acid and (b) a polyhydric alcohol, said reaction product having a hydroxyl number between 20 and 700 and (2) an organic polyisocyanate.

10. A process as described in claim 9 wherein the flame-retardant polyurethane resin is made cellular by including in the reaction mixture (3) a foaming agent.

11. A process as described in claim 9 wherein the reaction mixture used to prepare the flame-retardant polyurethane resin includes (3) a hydroxyl-containing polyether.

12. A process as described in claim 11 wherein the flame-retardant polyurethane resin being prepared is made cellular by including in the reaction mixture (4) a foaming agent.

13. A flame-retardant polyurethane resin comprising the reaction product of (1) the reaction product of (a) a polybasic compound selected from the group consisting of (2,3-dibromopropyl)succinic acid, (2,3-dibromopropyl)succinic anhydride, (2,3-dibromopropyl)succinyl halide, and esters of (2,3-dibromopropyl)succinic acid and (b) a polyhydric alcohol, said reaction product having a hydroxyl number between 20 and 700 and (2) an organic polyisocyanate.

14. A flame-retardant polyurethane resin reaction product as described in claim 13 which is made cellular by including in the reaction mixture used to prepare said reaction product (3) a foaming agent.

15. A flame-retardant polyurethane resin reaction product as described in claim 13 wherein the reaction mixture used to prepared said reaction product includes (3) a hydroxyl-containing polyether.

16. A flame-retardant polyurethane resin reaction product as described in claim 15 which is made cellular by including in the reaction mixture used to prepare said reaction product (4) a foaming agent.

17. A process for preparing flame-retardant polyurethane resin which comprises reacting (1) the di(2-hydroxyethyl) ester of (2,3-dibromopropyl)succinic acid and (2) an organic polyisocyanate.

18. A process for preparing flame-retardant cellular polyurethane resins which comprises reacting (1) the di-(2-hydroxyethyl) ester of (2,3-dibromopropyl)succinic acid, (2) an organic polyisocyanate, and (3) a foaming agent.

19. A process for preparing flame-retardant polyurethane resins which comprises reacting (1) the di(2-hydroxyethyl) ester of (2,3-dibromopropyl)succinic acid and (2) a hydroxyl-containing polyether, and (3) an organic polyisocyanate.

20. A process for preparing flame-retardant, cellular polyurethane resins which comprises reacting (1) the di(2-hydroxyethyl)ester of (2,3-dibromopropyl)succinic acid, (2) a hydroxyl-containing polyether, (3) an organic polyisocyanate, and (4) a foaming agent.

21. A flame-retardant polyurethane resin comprising the reaction product of (1) the di(2-hydroxyethyl) ester of 2,3-dibromopropyl))succinic acid and (2) an organic polyisocyanate.

22. A flame-retardant, cellular polyurethane resin comprising the reaction product of (1) the di(2-dihydroxyethyl) ester of (2,3-dibromopropyl)succinic acid, (2) an organic polyisocyanate, and (3) a foaming agent.

23. A flame-retardant polyurethane resin comprising the reaction product of (1) the di(2-hydroxyethyl) ester of 2,3-dibromopropyl)succinic acid and (2) a hydroxyl-containing polyether, and (3) an organic polyisocyanate.

24. A flame-retardant, cellular polyurethane resin comprising the reaction product of (1) the di(2-hydroxyethyl) ester of (2,3-dibromopropyl)succinic acid, (2) a hydroxyl-containing polyether, (3) an organic polyisocyanate, and (4) a foaming agent.

References Cited by the Examiner

UNITED STATES PATENTS

| | | | |
|---|---|---|---|
| 1,950,468 | 3/1934 | Zwilgmeyer | 260—75 |
| 3,055,850 | 9/1962 | Worsley et al. | 260—2.5 |
| 3,058,925 | 10/1962 | Robitschek | 260—2.5 |

LEON J. BERCOVITZ, *Primary Examiner.*

DONALD E. CZAJA, *Examiner.*